Dec. 3, 1929.          R. F. LONABERGER ET AL          1,738,497
                         LIQUID FUEL VAPORIZER
                  Filed Oct. 27, 1922     4 Sheets-Sheet 2

Inventors
Robert F. Lonaberger, and
Charles F. Sands.
By Emery, Booth, Janney & Varney
their Attorneys

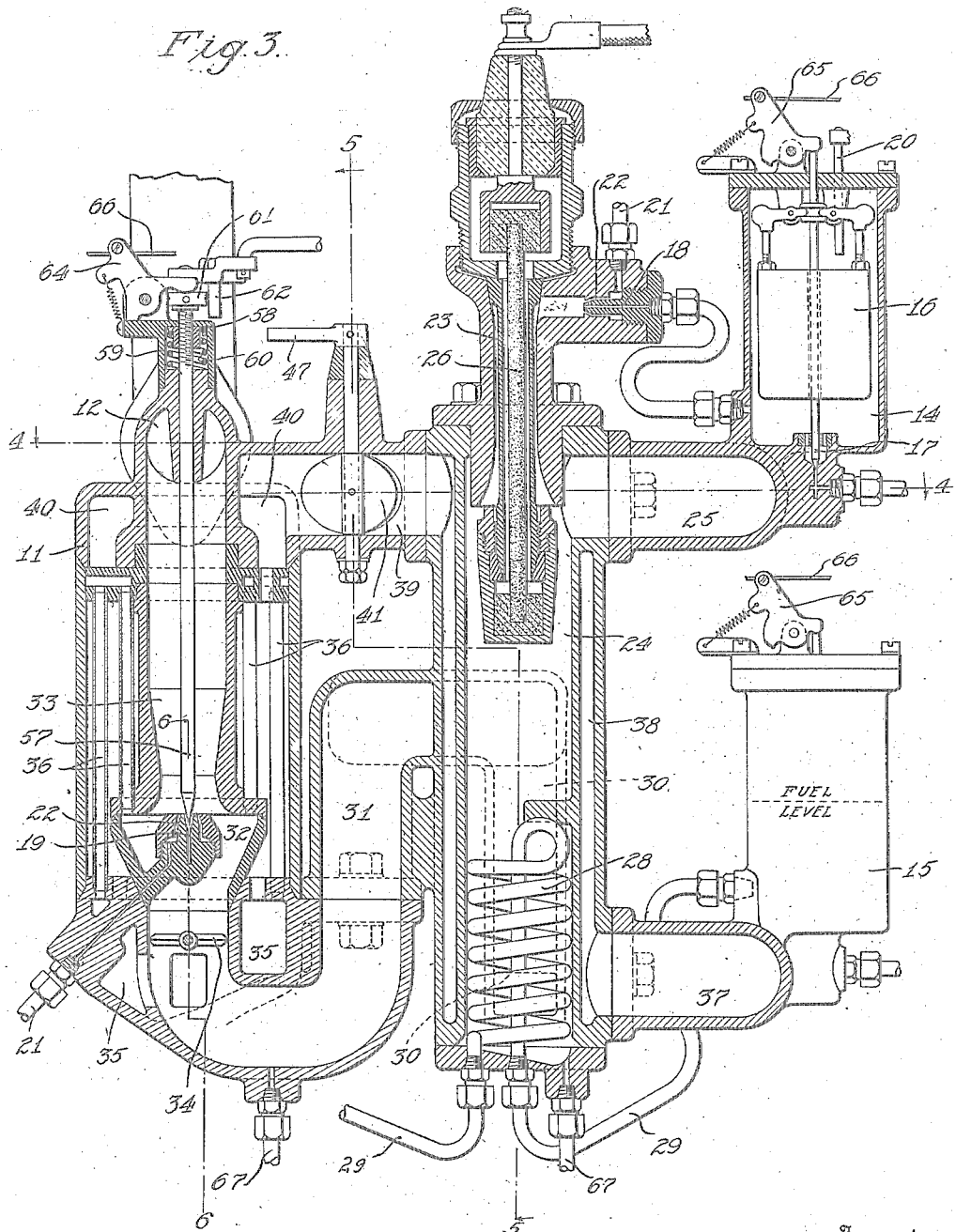

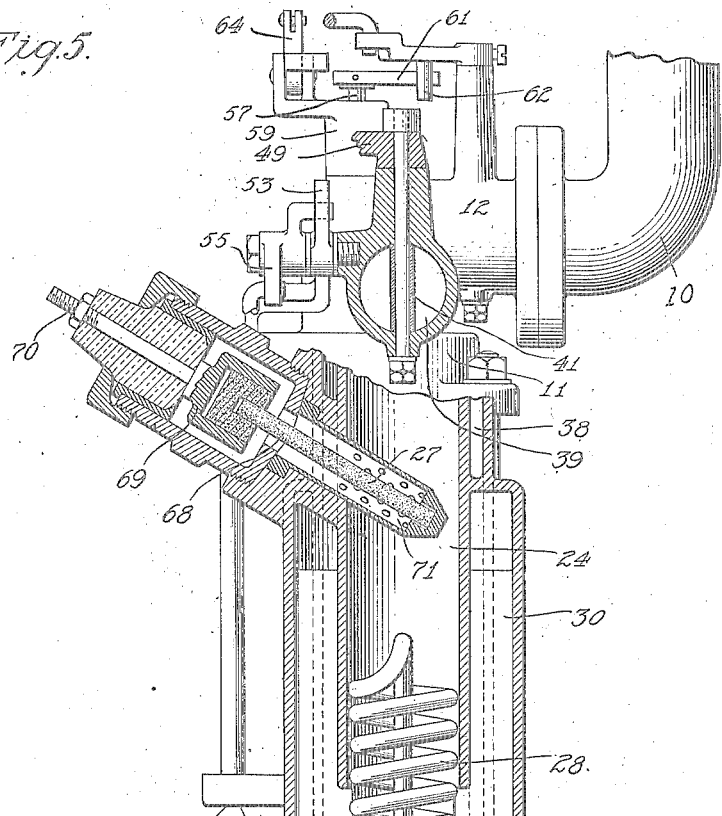
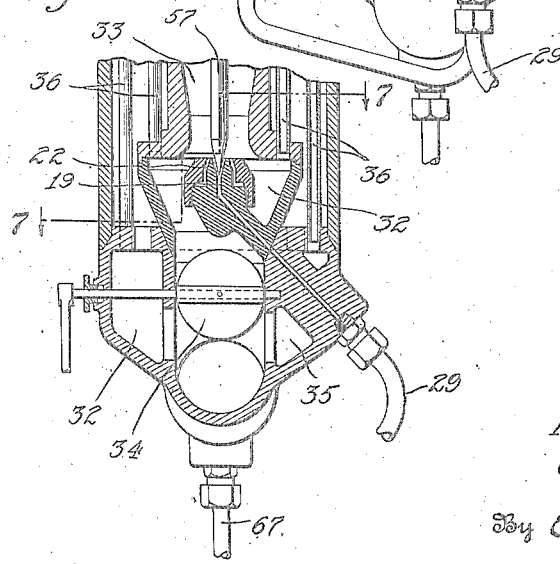
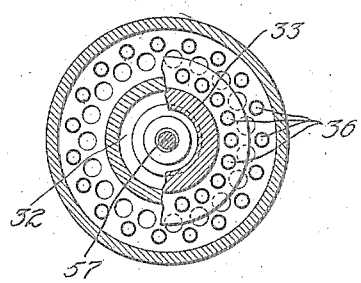

Patented Dec. 3, 1929

1,738,497

UNITED STATES PATENT OFFICE

ROBERT F. LONABERGER AND CHARLES F. SANDS, OF READING, PENNSYLVANIA, ASSIGNORS TO LLOYD A. UNGER, TRUSTEE.

LIQUID-FUEL VAPORIZER

Application filed October 27, 1922. Serial No. 597,426.

This invention relates to devices for producing a gaseous fuel from heavy liquid hydrocarbons, and specifically aims to improve the operation of internal combustion engines using kerosene and other non-volatile liquid fuels; also to improve the burning properties of gaseous fuel mixtures produced from heavy liquid fuels, so as to eliminate uncombined carbon and smoke from the products of combustion; and to provide a vaporizer for heavy liquid fuels, such as petroleum distillate and fuel oil, to enable such fuels to be used in internal combustion engines designed for running on gasoline.

Further aims and advantages of the invention appear hereinafter in connection with the description of the illustrative embodiment thereof shown in the drawings, wherein Fig. 1 is a side elevation of a vaporizer intended for a multi-cylinder vertical explosion engine;

Fig. 3 is a vertical section on the line 3—3 in Fig. 2;

Fig. 5 is a transverse cross-section on the line 5—5 in Fig. 3;

Fig. 6 is a fragmentary cross-section on the line 6—6 in Fig. 3, showing the main fuel nozzle and starting valve in open position; and Fig. 7 is a cross-section through the main mixing chamber on the line 7—7 in Fig. 6.

Figure 1:
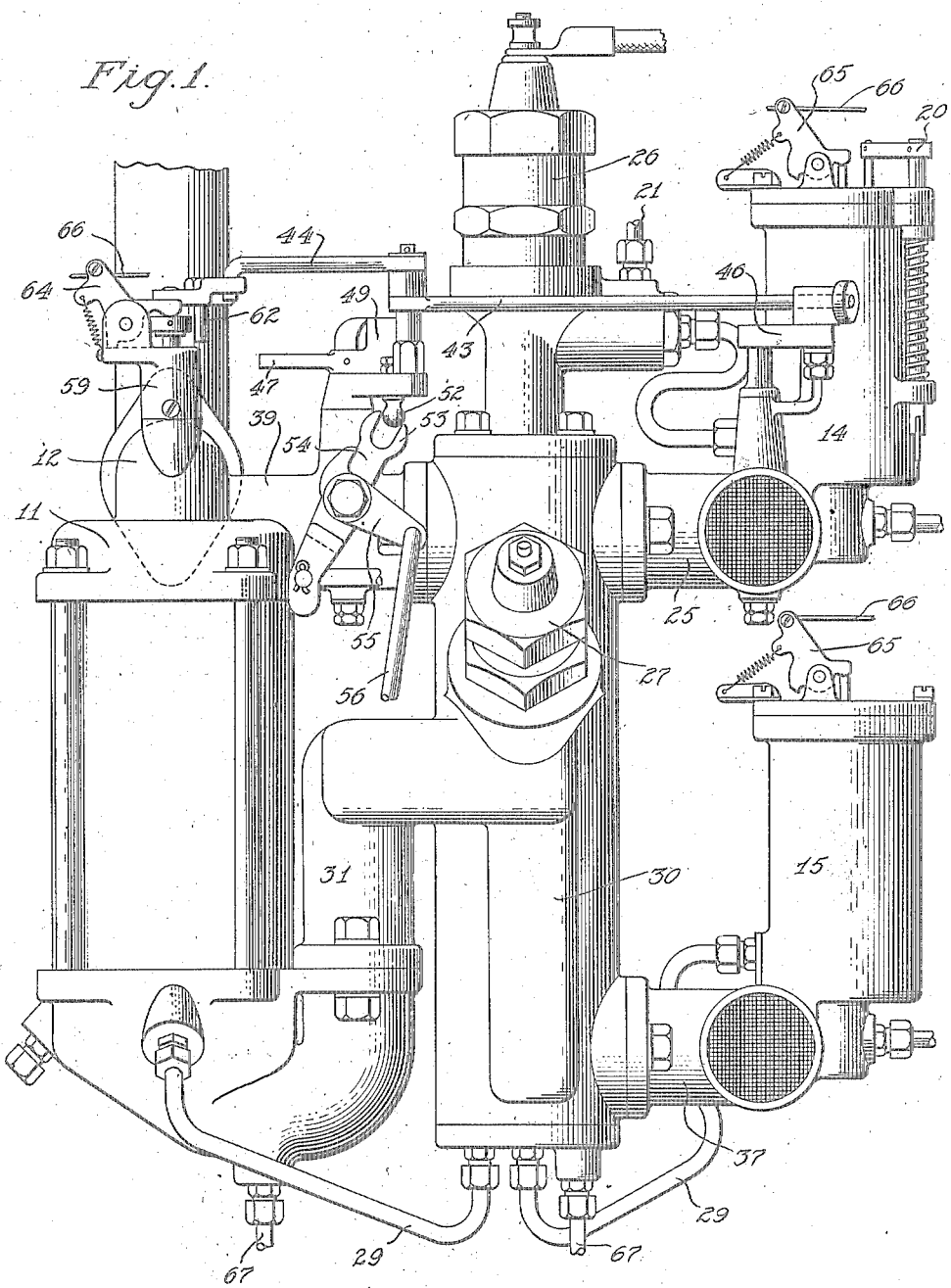

The embodiment of the invention illustrated in the drawings is particularly intended for automobile engines, and comprises a body 11 provided with a flanged outlet pipe 12 which is adapted to be attached to the inlet pipe or manifold 10 of an engine, to which it supplies vaporized fuel mixed with air ready for combustion in the usual manner. A throttle valve 13 is arranged in this outlet pipe, and there are other features of resemblance to the ordinary carburetor for vaporizing gasoline.

Liquid fuel is supplied to the device from a suitable gravity or pressure tank (not shown) through two feed chambers, 14, 15, arranged for convenience one over the other. The upper or auxiliary feed chamber 14 supplies the fuel for starting purposes, and for heating and vaporizing the fuel from the main feed chamber 15. Floats 16 (see Fig. 3), and valves 17 controlled thereby through suitable adjustable connections, maintain the liquid fuel at the proper level in the feed chambers to feed by gravity to the auxiliary or heating feed nozzle 18 and the main feed nozzle 19. A flooding device 20 is provided for depressing the float 16 in the auxiliary fuel chamber upon starting the engine cold.

Air under pressure is supplied through the pipes 21 to the air passages 22, surrounding the feed nozzles 18, 19, and discharges past the nozzle openings for the purpose of atomizing the fuel and insuring a continuous flow varying in quantity with the velocity of the air. Preferably the air is supplied from a pump (not shown) driven at a speed proportional to the speed of the engine, and thereby the flow of fuel is increased with an increase in the engine speed; but any suitable means for supplying air at the proper rate for efficient operation may be utilized.

The auxiliary fuel nozzle 13 discharges into a duct 23 leading to a mixing and partial combustion or burning chamber 24 where the atomized fuel is mixed with air from an inlet pipe 25. The atomized fuel and air are conducted past a suitable heating element 26 arranged within the duct 23, preferably of the type of electrical resistance heating device shown and described in our Patent No. 1,483,819, dated February 12, 1924; and thereby the atomized fuel is vaporized and forms a rich mixture which passes into the chamber 24 where it is ignited by any suitable means such as the electrical igniter 27; (see Fig. 5) hereinafter described, and partly burned, the hot gases thereby produced being conducted over the coil 28 in the fuel pipe 29 between the main fuel feed chamber 15 and the main feed nozzle 19 to heat it and vaporize the fuel therein.

The gaseous products pass from the burning chamber 24 through the passages 30 (see Figs. 3 and 5) in the walls surrounding the burning chamber and pipe 31 to the lower end 32 of the main mixing chamber 33, and thence through the main mixing chamber into the delivery pipe 12, and past the throttle valve 13 to the engine inlet pipe 10. At the time of starting the engine these hot gases pass directly from the pipe 31 into the lower end 32 of the main mixing chamber, and by the main feed nozzle 19, and mingle with the atomized fuel issuing from the feed nozzle. A suitable valve 34 is arranged in the passage between the pipe 31 and the lower end 32 of the main mixing chamber to cut off the flow of hot gases from the burning chamber as the device gets warmed up and deflect them into the annular chamber 35 surrounding the end of the pipe 31, and thence they pass up through the outer series of small tubes 36 and down through the inner return tubes to reach the lower end 32 of the main mixing chamber. The tortuous and restricted passage through these tubes effectually prevents any flame from reaching the main mixing chamber.

Additional air for mixing with the vaporized fuel from the main nozzle 19 is taken in through the inlet pipe 37 and warmed in the annular chamber 38 surrounding the burning chamber 24, and thence is led through the valved pipe 39 to the annular chamber 40 surrounding the main mixing chamber 33, and is forced around and past the series of tubes 36 into the annular chamber 35, where the air from intake pipe 37 and the hot gases from the burning chamber 24 mingle and pass together through the tubes 36 and into the lower end 32 of the main mixing chamber, and through the narrow passage or throat surrounding the main feed nozzle 19 into the main mixing chamber 33. The amount of additional air admitted from the intake 37 may be controlled by the valve 41 in the pipe 39. This valve also serves as a choke valve to assist in starting the engine as hereinafter described.

The cooler additional air from the intake 37 keeps the burning chamber 24 from getting overheated, and cools the heated gases from the burning chamber sufficiently to prevent ignition of the fuel in the main mixing chamber, as the flame will not propagate itself through the tubes 36. This air also furnishes the necessary amount of oxygen to make an explosive vaporized mixture when mingled with the vaporized fuel issuing from the nozzle 19.

Figure 4:
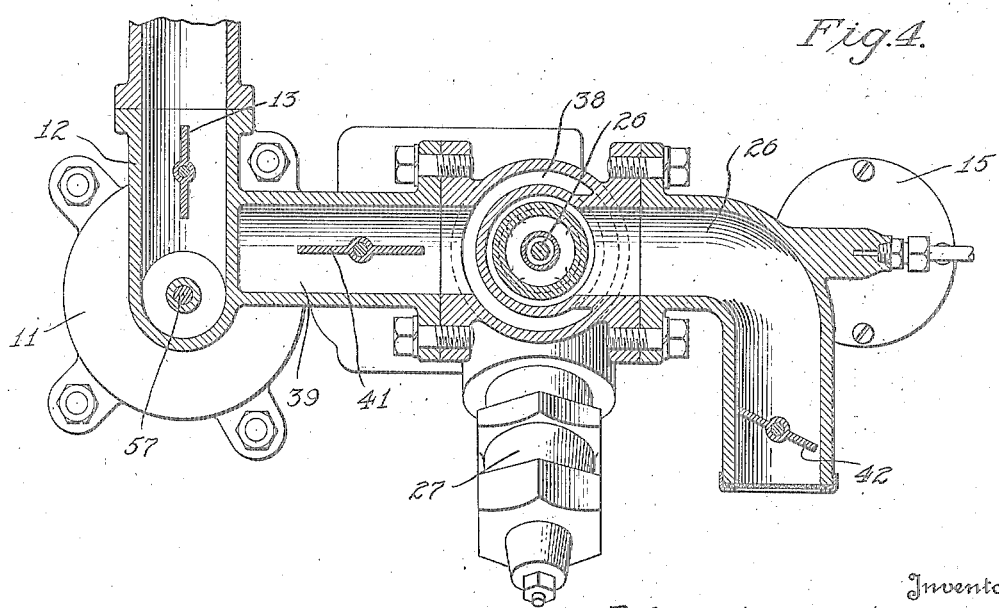
Fig. 4 is a horizontal cross-section on the line 4—4 in Fig. 3.

For the purpose of controlling the relative proportions of the air supplied to the burning chamber and main mixing chamber, a valve 42 is arranged in the air inlet pipe 25 leading to the burning chamber 24 to operate at the same time as the valve 41, but in the opposite direction, that is, when one closes the other opens (see Fig. 4). Any suitable device, such, for example, as the link 43, may be used for operatively connecting these valves. A second link 44 may be provided to connect the air control valves 41, 42, with the throttle valve 13 so all three valves may be operated conjointly, the throttle valve and additional air valve opening together while the heating air valve closes. A set screw 45 may be used to adjust the minimum opening of the preheating air valve 42, further movement of the link 43 causing it to slide through the end of the arm 46 that operates that valve.

Figure 2:
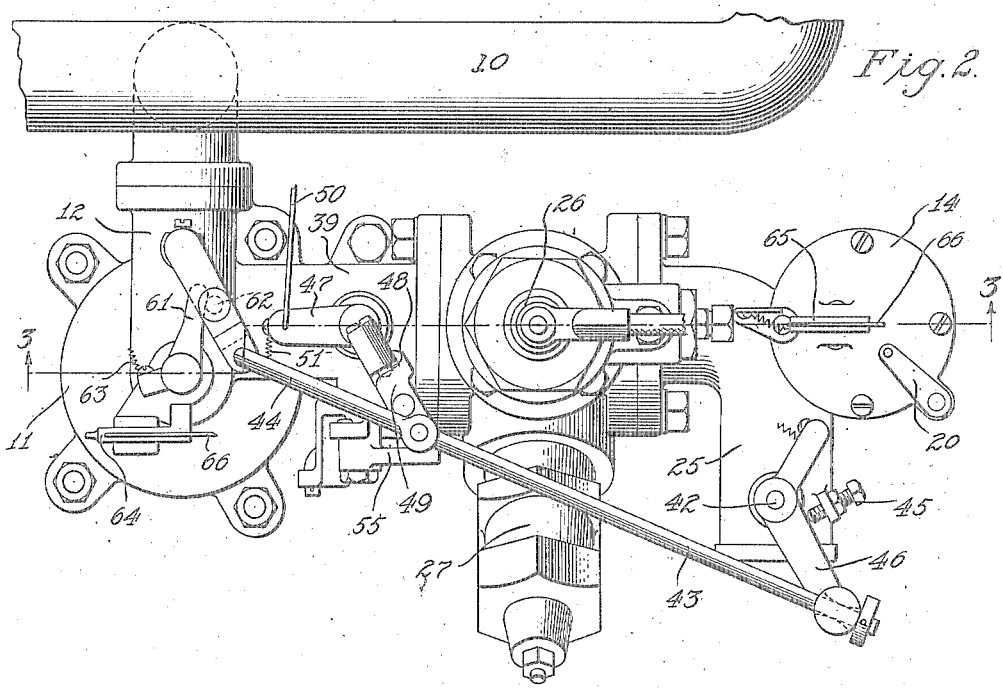
Fig. 2 is a plan view of the same.

In order that the additional air valve 41 may be closed to choke the air intake pipe and make a richer mixture for starting the engine, the arm 47 operating it (see Fig. 2) is provided with a spring pin 48 normally engaging in a notch in the operating lever 49 to cause the lever and arm to move together. The choker rod 50 is connected both to the valve operating arm 47 (whereby the valve 41 may be held closed) and to the flooding device 20 for depressing the float in the feed chamber 14 when it is desired to start the engine. Upon releasing the choker rod the valve opening spring 51 will open the valve until the spring pin 48 engages in the notch, whereupon the valve 41 will follow the motions of the operating lever 49 and throttle valve 13. The choker rod is also connected to the valve 34 in the passage 31 to the mixing chamber, so as to open this valve on starting and close it when the valve 41 is released.

Any suitable means for operating the throttle and air valves may be provided. In the device shown in the drawings (see Figs. 1 and 2) the additional air valve lever 49 has a pivoted follower 52 which engages in a fork 53 on a control lever 54 the other end of which may be connected to the accelerator rod or other suitable control device. A hook lever 55 also engages the control lever 54 to move it toward open position, while also leaving it free to be moved toward open position by the accelerator rod. The rod 56 for moving the hook lever 55 may be connected to the quadrant lever on the steering wheel, if the device is applied to an automobile engine, or to any convenient control handle. Thus either means of controlling the throttle and air valves may be used as in the case of the ordinary carbureter for automobile engines.

In order to vary the amount of vaporized fuel admitted to the main mixing chamber 33 the main feed nozzle 19 is provided with an adjustable needle valve 57 operated in conjunction with the throttle valve 13 by any suitable means. As shown in Fig. 3, the needle valve 57 is threaded through a nut 58 at its upper end, the nut being normally held in stationary position in a housing 59 by a spring 60. The upper end of the needle valve projects above the housing and has an arm 61 pinned to it which projects into the path of a projection 62 on the arm that operates the throttle valve 13. A spring 63 attached to the arm 61 returns the needle valve when the throttle is closed.

A bell crank lever 64 is mounted on the housing 59 with one branch engaging the end of the needle valve to depress it and close the valve when desired, the spring 63 permitting the needle valve and nut to move down together when depressed by the bell crank lever. Similar bell cranks 65 are provided for the float controlled valves 17 in the fuel feed chambers 14, 15, to enable them to be closed to prevent passage of liquid fuel when desired. The bell cranks 64 and 65 are connected by a suitable cable 66 or other connection to a control button or other device conveniently located to permit all three fuel valves to be closed simultaneously, as is desirable when the engine is not running to prevent leakage of fuel. Fuel drip and drain pipes 67 are also provided at low points in the body of the device for catching condensed fuel and returning it to the fuel supply.

The igniter 27 for starting combustion of the auxiliary fuel heater comprises a resistance element 68 (see Fig. 5) preferably a carbon rod, that may be raised to incandescence instantaneously by a suitable current from a small storage battery (not shown). This resistance element is mounted at one end in an insulated support 69 having a terminal connection 70, and at the other end in a shield 71 inserted in the side wall of the burning chamber 24. The shield may be made of nickel or other suitable metal or alloy, and preferably is provided wth a number of small orifices to permit a portion of the fuel mixture to come in contact with the incandescent carbon rod. The shield prevents rapid deterioration of the rod by oxidation. The igniter is only necessary for a brief moment at starting to light the fuel mixture in the burning chamber, which continues to burn thereafter until the engine is stopped.

The device may be operated with any internal combustion engine of the usual single or multi-cylinder types, having suitable piston and valve mechanism for sucking in successive charges, compressing the charges, and igniting them by an electric spark or other suitable means. First the igniter 27 is started to heat the burning chamber 24, and when the motor starts the heating element 26 operates to warm up the fuel and air mixing passages leading to the burning chamber. The choker rod is actuated to close the air valve 41 and open the gas valve 34 and flood the fuel chamber 14. Upon admitting air from the pressure pipe 21 to the heating fuel feed nozzle 18 a spray of air and atomized liquid fuel blow into the burning chamber past the heating element, and is ignited and burns. As the time for burning is insufficient to oxidize all of the fuel completely the products of combustion leaving the burning chamber contain carbon monoxide and vaporized fuel suitable for commingling with the air to form an explosive mixture, and the commingled burnt gases, fuel vapor and air, are conducted through the pipe 31 and directly into the mixing chamber 33, where they mingle with air and fuel vapor as soon as it issues from the nozzle 19. The amount of heat generated in the burning chamber is sufficient to vaporize the fuel in the coil 28 almost instantaneously. As soon as ignition takes place in the burning chamber the ignition device 27 may be turned off; but the heating element 26 is preferably kept in action during the whole period of operation of the vaporizer.

The vaporization of the liquid fuel in the coil 28 creates sufficient pressure in the main fuel feed pipe 29 and nozzle 19 to cause the vaporized fuel to mingle with the air issuing (also under pressure) from the air passages 22 in a stream which passes at high velocity into the mixing chamber and thence into the cylinders, thereby supplementing the suction and assisting in filling the cylinders with full charges of fuel.

As the device warms up, the choker rod is moved to close the gas valve 34, open the air valve 41 and raise the flooding device 20, whereupon the hot mixture of gas, vapor and air, from the burning chamber is diverted through the pipes 36 to warm the mixing chamber and additional air supply from the auxiliary air intake 37. As the throttle valve 13 is opened to increase the amount of mixture supplied to the engine the auxiliary air valve 41 is opened and the air valve 42 is closed correspondingly, thereby maintaining the proper balance between the proportions of preheating air and additional air for the best results. Also opening the throttle valve 13 increases the opening of the valve metering pin 57 that controls the amount of vaporized fuel issuing from the nozzle 19 in the embodiment of the device illustrated in the drawings.

It is evident that the various features of the invention, such as the preliminary heating device for starting the operation of the vaporizer, the combustion burner for developing the heat necessary for vaporization of the heavy fuel, the auxiliary air heating and controlling means for modifying the gaseous fuel to suit operating conditions, and the additional fuel supply means and controlling devices therefor, each may be utilized separately and in other combinations for other purposes than the internal combustion engine vaporizer herein described.

Having described an illustrative embodiment of our invention, without limiting ourselves thereto, we claim the following:

1. In a liquid fuel vaporizing and gasifying apparatus, two spaced fluid mixing chambers and an elongated connecting burning and vaporizing chamber, a liquid fuel atomizing nozzle discharging into the first mixing chamber, means for supplying air under pressure to said atomizing nozzle for producing an easily ignitable mixture, an ignition device for igniting said fuel mixture, a jacket surrounding said burning chamber and having a discharge outlet discharging into the second mixing chamber, and means for circulating supplemental air through said jacket to cool it and warm the air prior to mixing it with the gaseous or vaporized products in said second mixing chamber.

2. In a liquid fuel vaporizing and gasifying apparatus, two spaced fluid mixing chambers and an elongated connecting burning and vaporizing chamber, a liquid fuel atomizing nozzle discharging into the first mixing chamber, means for supplying air under pressure to said atomizing nozzle for producing an easily ignitable mixture, means for heating said fuel mixture for starting purposes, an ignition device for igniting said fuel mixture, a jacket surrounding said burning chamber and having a discharge outlet discharging into the second mixing chamber, and means for circulating supplemental air through said jacket to cool it and warm the air prior to mixing it with the gaseous or vaporized products in said second mixing chamber.

3. In a liquid fuel vaporizing and gasifying apparatus, two spaced mixing chambers and an elongated connecting burning and vaporizing chamber, a liquid fuel atomizing nozzle discharging into the first mixing chamber, means for supplying air under pressure to said atomizing nozzle for producing an easily ignitable mixture, an ignition device in said burning chamber for igniting said fuel mixture, means for supplying a proportioned amount of additional air to said burning chamber, a jacket surrounding said burning chamber and having a discharge outlet discharging into the second mixing chamber, and means for circulating supplemental air through said jacket in the direction opposite to that of the gaseous or vaporized products in the chamber within to cool it and warm the air prior to mixing it with the gaseous or vaporized products in said second mixing chamber.

4. Means for generating a combustible gas or vapor from heavy liquid fuel, comprising a main fuel supply duct and an auxiliary fuel supply duct, means for finely dividing a stream of fuel from said auxiliary supply duct, an air supply duct and means for mixing air with said finely divided fuel, a heating means for said mixture of finely divided fuel and air independent of the combustion thereof, means for burning some of said fuel and air mixture to vaporize the unburned fuel therein, and means for conducting heat from the burning products to vaporize fuel from the main fuel supply.

5. Means for generating a combustible gas or vapor from heavy liquid fuel, comprising a main fuel supply duct and an auxiliary fuel supply duct, pressure means for producing a stream of air and finely divided fuel from said auxiliary supply duct, an additional air supply duct and means for mixing air with said stream, a burning chamber and ignition device for starting and maintaining partial combustion of said fuel and air mixture to vaporize the unburned fuel therein, and a fuel duct of small cross-section in comparison with its length arranged in said burning chamber for conducting heat from the burning products to vaporize fuel from the main fuel supply.

6. A vaporizer of the partial combustion type for heavy liquid fuels, comprising a main fuel supply duct and an auxiliary fuel supply duct, pressure means for producing a stream of air and finely divided fuel from said auxiliary supply duct, an additional air supply duct and means for mixing air with said finely divided fuel stream, means for maintaining partial combustion of said fuel and air mixture and vaporizing the unburned fuel therein, a fuel duct in said chamber exposed to the heat from the hot products of combustion to vaporize fuel from the main fuel supply duct, an additional air supply duct in proximity to said combustion means for heating said air, and means for mixing said vaporized fuel with heated air from said supply duct.

7. A vaporizer of the partial combustion type for heavy liquid fuels, comprising means for burning a portion of the fuel to heat and vaporize another portion of said fuel, a chamber for mixing the products of combustion and vaporized fuel with additional air, an outlet from said chamber provided with a valve for admitting said additional air to said chamber, a throttle valve in said outlet for controlling the volume of mixture, control mechanism for said valve, and adjustable means operatively connected to the throttle valve control mechanism and additional air valve for controlling the proportions of the mixture of burnt products and additional air at different positions of said throttle valve.

8. A vaporizer of the partial combustion type for heavy liquid fuels, comprising a means for burning a portion of the fuel with a deficiency of air to produce a lean mixture and to heat and vaporize another portion of said fuel, means for controlling the air admitted for burning said fuel, said burnt portion being mixed with additional air and commingled with said vaporized portion to form an explosive mixture, means for controlling said additional air, and manually adjustable means connecting said air controlling means for controlling the relative proportions of said air for burning and said additional air.

9. In apparatus for generating a combustible gas from a liquid fuel by partial combustion, comprising a partial combustion chamber, a fuel feed nozzle, means coacting with said chamber for preheating the fuel discharging therefrom, an inner air passage surrounding said nozzle, a system of small air passages surrounding said inner air passage and leading thereto, means coacting with said fuel preheating means for preheating a portion of the air supply to a high temperature and conducting it through said small air passages, and means for conducting additional air around said small air passages and then mingling it with said preheated air and passing the mixture through said inner passage.

10. In apparatus for generating a combustible gas from liquid fuel by partial combustion, comprising, a partial combustion chamber, a fuel feed nozzle, means coacting with said chamber, for preheating the fuel discharging therefrom, an inner air passage surrounding said nozzle, a system of small air passages surrounding said inner air passage and leading thereto, means coacting with said fuel preheating means for preheating a portion of the air supply to a high temperature and conducting it through said small air passages, means for conducting additional air around said small air passages and then mingling it with said preheated air and passing the mixture through said inner passage, and means for controlling the relative proportions of preheated air and additional air.

11. In apparatus for generating a combustible gas from liquid fuel by partial combustion, comprising, a partial combustion chamber, a fuel feed nozzle, means coacting with said chamber for preheating the fuel discharging therefrom, an inner air passage surrounding said nozzle, a system of small air passages surrounding said inner air passage and leading thereto, and a throttle valve for controlling the outflow from said vaporizer, means coacting with said fuel preheating means, for preheating a portion of the air supply to a high temperature and conducting it through said small air passages, means for conducting additional air around said small air passages and then mingling it with said preheated air and passing the mixture through said inner passage, and means for controlling the relative proportions of preheated air and additional air, said controlling means operating in conjunction with said throttle valve.

12. In apparatus for generating a combustible gas from liquid fuel by partial combustion, a fluid mixer comprising a mixing chamber having a fuel feed nozzle and an air passage surrounding it, an air pipe leading to said air passage, a heater for preheating fuel supplied to said nozzle and the air supplied to said air pipe, said heater operating by burning fuel therein and having an outlet discharging into said mixing chamber, a by-pass leading from said outlet to said passage and having ducts for conducting said air, and a valve for closing said outlet and causing said air to pass through said by-pass and ducts on its way to said passage.

13. In apparatus for generating a combustible gas by partial combustion from liquid fuel, a fluid mixer comprising a mixing chamber having a fuel feed nozzle and an air passage surrounding it, an air pipe leading to said air passage, a heater for preheating fuel supplied to said nozzle and the air supplied to said air pipe, said heater operating by partial combustion of liquid fuel and having an outlet pipe leading to said mixing chamber, a by-pass leading from said outlet pipe to said passage and comprising air heat exchange means, a valve for closing said outlet pipe and causing said air to pass through said by-pass to said passage, an additional air supply to said passage and choker valve therein, and means for closing said choker valve and opening said first mentioned valve upon starting.

14. Apparatus for generating a combustible gas from liquid fuel by partial combustion comprising, in combination, a partial combustion chamber, means for supplying a combustible mixture of fuel and air to said chamber, an electric igniter for said mixture, a main mixing chamber and outlet therefrom for gasified and vaporized fuel and air, an intake passage to conduct the gaseous and vaporized products of combustion from said partial combustion chamber to said mixing chamber, a fuel heating passage coacting with said partial combustion chamber and connected to a source of fuel supply, said heating passage connected to discharge fuel into said mixing chamber, a main air valve for admitting air to the intake passage, and a supplemental air valve arranged to supply auxiliary air to said mixing chamber when operating under conditions approximating full capacity.

15. A liquid fuel vaporizer of the type in which a portion of the fuel is burned to provide heat, comprising a fuel nozzle, a liquid fuel supply well and duct therefrom to said nozzle, a combustion chamber, means for supplying fuel mixture thereto, a liquid fuel vaporizing passage in said combustion chamber, means for supplying liquid fuel to and controlling the flow of vaporized fuel from said vaporizing passage, including a nozzle, an auxiliary air valve discharging past the outlet from said vaporizing passage, means coacting with said auxiliary valve for opening said nozzle when said valve is opened, and means for maintaining combustion in said combustion chamber.

16. A liquid fuel vaporizer of the type in which a portion of the fuel is burned to provide heat, comprising a fuel nozzle, a liquid fuel supply well and duct therefrom to said nozzle, a combustion chamber, means for supplying fuel mixture thereto, a liquid fuel vaporizing passage in said combustion chamber, means for supplying liquid fuel to and controlling the flow of vaporized fuel from said vaporizing passage, including a nozzle, an auxiliary air valve discharging past the outlet from said vaporizing passage, adjustable means for controlling the amount of opening of said valve, means coacting with said auxiliary valve for opening said nozzle when said valve is opened, and means for maintaining combustion in said combustion chamber.

17. A liquid fuel vaporizer of the type in which a portion of the fuel is burned to provide heat, comprising a mixing chamber, a fuel vapor nozzle coacting therewith, a vaporizer conduit communicating with said nozzle, means for supplying liquid fuel to said vaporizer conduit, a combustion chamber adjacent to said vaporizer conduit, an outlet from said combustion chamber into a passage leading to said mixing chamber, means for admitting air to said passage in a stream leading past said outlet, and a preliminary mixing chamber having fuel and air supply means and discharging into said combustion chamber.

18. A liquid fuel vaporizer of the type in which a portion of the fuel is burned to provide heat, comprising a mixing chamber, a fuel vapor nozzle coacting therewith, a vaporizer conduit communicating with said nozzle, means for supplying liquid fuel to said vaporizer conduit, a combustion chamber adjacent to said vaporizer conduit, an outlet from said combustion chamber into a passage leading to said mixing chamber, means for admitting air to said passage in a stream leading past the discharge outlet, valve means for controlling said air, and a preliminary mixing chamber having fuel and air supply means and discharging into said combustion chamber.

In testimony whereof, we have signed our names to this specification.

ROBERT F. LONABERGER.
CHARLES F. SANDS.